Sept. 25, 1951   J. M. TYRNER   2,568,938
SCARFING APPARATUS
Filed Aug. 3, 1948   2 Sheets-Sheet 1

INVENTOR
JOSEPH M. TYRNER
BY
ATTORNEYS

Sept. 25, 1951   J. M. TYRNER   2,568,938
SCARFING APPARATUS

Filed Aug. 3, 1948   2 Sheets-Sheet 2

INVENTOR
JOSEPH M. TYRNER
BY
ATTORNEYS

Patented Sept. 25, 1951

2,568,938

UNITED STATES PATENT OFFICE 2,568,938

SCARFING APPARATUS

Joseph M. Tyrner, New York, N. Y., assignor to Air Reduction Company, Incorporated, a corporation of New York Application August 3, 1948, Serial No. 42,232

6 Claims. (Cl. 266—23)

This invention relates to apparatus for thermochemically scarfing or desurfacing ferrous metal bodies such as ingots, billets, blooms and the like.

In apparatus of this kind, especially if intended to scarf all of the surfaces of the workpiece simultaneously, it is desirable that the scarfing heads or tips be mounted on supporting means which will permit them to be positioned against the work surfaces to be scarfed quickly and easily, and which will guide them so that when they are positioned against work-pieces of various sizes the angularity of the scarfing jets will always remain the same. The latter result can be obtained by the use of horizontally and vertically slidable supports for the torch tips, but sliding joints are objectionable in scarfing apparatus because it is difficult to keep them free from slag and dirt. Tip supports rendered movable by being pivotally mounted are therefore preferable.

This type of tip support has been employed in scarfing machines in which the member that carries a tip or a pair of tips is supported by a folding parallelogram structure, but to permit both horizontal and vertical components of movement of each torch tip parallel to itself it has been necessary to make use of two complete and independent folding parallelogram mechanisms—one to permit the vertical component of movement of the torch tip, and the other to permit the horizontal component of movement. This necessitates the use of many movable parts and bearings which is undesirable in a scarfing installation.

The principal object of this invention is to provide scarfing apparatus in which the tip support is of the folding parallelogram type but is an improvement over previous tip supports of this type and is free of the above noted objections to this type of tip support.

According to the invention, each scarfing tip, or each pair of them arranged to simultaneously scarf two contiguous surfaces of the work-piece, is mounted on a member which is supported on the base of the machine by a folding parallelogram structure which comprises four parallel links extending rearwardly from the tip supporting member and arranged quadrilaterally, the forward end of each link having a universal connection to the tip supporting member and the rear end of each link having a universal connection to the base, whereby the tip supporting member is movable parallel to itself both vertically and horizontally by folding parallelogram mechanism in which each of the above-mentioned links constitutes part of one folding parallelogram that permits movement of the tip-supporting member in one direction and also part of a contiguous folding parallelogram that permits movement of the tip-supporting member in a direction at right angles to the first direction, thereby greatly simplifying the kind of folding parallelogram structure that has heretofore been necessary to support the torch tips for similar movement.

Scarfing apparatus embodying the invention is illustrated in the accompanying drawings, in which.

Figure 1:
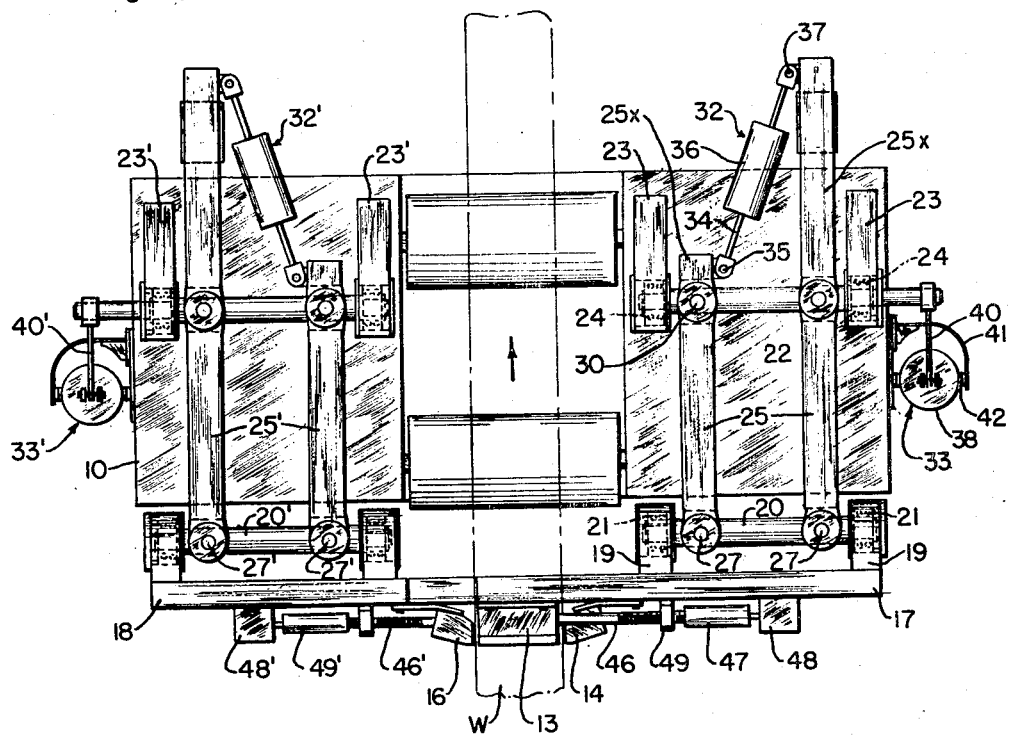
Figure 1 is a plan view of the apparatus.

Referring to the drawings, the apparatus comprises a base 10 (Figs. 1, 2 and 3) which, in the particular apparatus illustrated in the drawings, is in the nature of a carriage having wheels 11 (Figs. 2 and 3) adapted to run on a track 12 which crosses under the bed of the mill roll conveyor. Thus the scarfing apparatus can be moved to an inoperative position out of the mill line to permit uninterrupted movement of the billets or other work-pieces along the conveyor, or to the operative position shown in Figs. 1, 2 and 3 from which the scarfing tips can be brought into scarfing relation with the faces of the billet or other workpiece W on the roll conveyor.

The apparatus has four scarfing tips 13, 14, 15 and 16 (Fig. 2), preferably of the block type, arranged so that they can simultaneously scarf all four faces of a workpiece of rectangular cross-section. The tips 13 and 14 are mounted on a plate 17 so that the row of scarfing oxygen delivery orifice 130 in the tip 13 is disposed at right angles to the row of scarfing oxygen delivery orifices 140 in the tip 14 whereby they can scarf two contiguous faces of the work-piece. Similarly the tips 15 and 16 are mounted on a plate 18 with the row of scarfing oxygen delivery orifices 150 in the tip 15 arranged at right angles to the row of scarfing oxygen delivery orifices 160 in the tip 16 so that they can scarf the other two contiguous faces of the work-piece.

Figure 3:
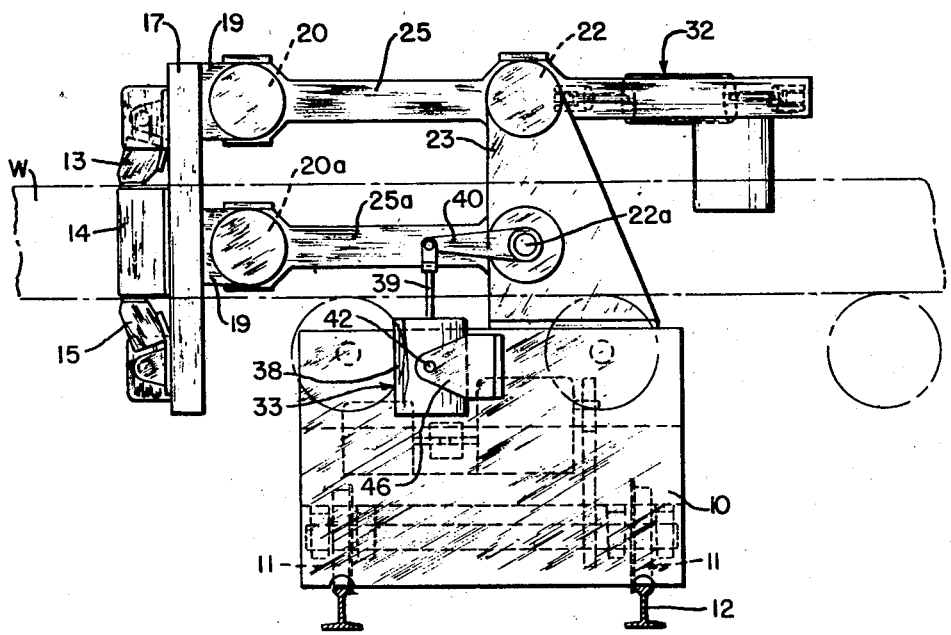
Fig. 3 is a right side elevation of the apparatus shown in Figs. 1 and 2.

As best shown in Figs. 1 and 3, the plate 17 on which the two tips 13 and 14 are mounted has four lugs 19 on its rear face arranged in upper and lower pairs. A transversely extending shaft 20 is rotatably mounted at its opposite ends in the upper pair of lugs by bearings 21 (Fig. 1) and a second transversely extending shaft 20a is similarly mounted in the lower pair of lugs in parallel relation to the first shaft (Fig. 3). The bearings 21 are shown in the drawings as ball bearings but any suitable type of bearings may be employed.

A second pair of shafts 22 and 22a, also in upper and lower relation and parallel to the shafts 20 and 20a, are mounted in a pair of upright stanchions 23 on the base or carriage 10 located to the rear of the plate 17 and the shafts 20 and 20a mounted thereon. This second pair of shafts are also rotatably mounted in suitable bearings such as ball bearings 24 (Fig. 1).

Figure 4:
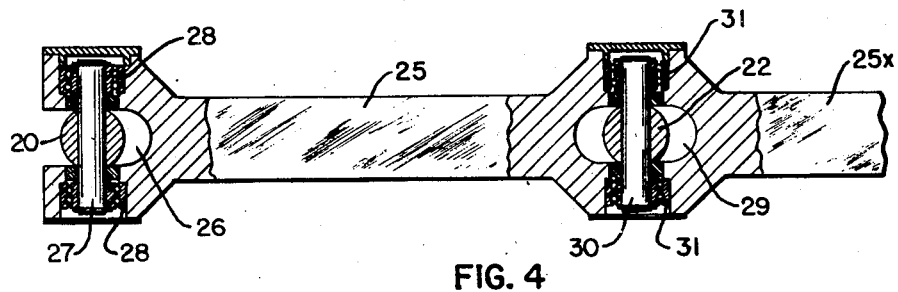
Fig. 4 is a side view of a portion of one of the links, some parts being shown in vertical section.

Two parallel longitudinally extending links 25 (Fig. 1) are connected between the two upper shafts 20 and 22, and a second pair of longitudinally extending parallel links, only one of which shows at 25a in Fig. 3, are similarly connected between the two lower shafts 20a and 22a. The four links are thus arranged quadrilaterally. Wherever a link is connected to one of the shafts the link is permitted to pivot about an axis which is at right angles to the shaft axis. The manner in which the two upper links 25 are pivotally connected to the two upper shafts 20 and 22 to permit this is shown in Fig. 4. The forward end of each link is bifurcated to form a slot 26 in which a flattened portion of the shaft 20 is received. A pivot pin 27 extends vertically through the flattened portion of the shaft and is keyed or wedged in the shaft so that it is in fixed relation to it. The ends of the pivot pin project above and below the shaft and are mounted in ball bearings 28 housed within the two arms of the bifurcated end of the link. A flattened portion of the rear upper shaft 22 is received in a slot 29 in an enlarged portion of the link and this flattened portion of the shaft carries a pivot pin 30 which is similar to the pivot pin 27 just described and which is rotatably mounted at its ends in ball bearings 31 housed in the portions of the link which straddle the shaft. Each of the upper links 25 has a portion 25x which extends rearwardly beyond the upper rear shaft 22, the purpose of which will be described later (see also Fig. 1).

The forward ends of the two lower links 25a are bifurcated and pivotally connected to the lower shaft 20a on the plate 17 in the same manner that the forward ends of the two upper links are bifurcated and pivotally connected to the upper shaft on this plate. Since it is not necessary that the lower links have a portion which extends to the rear of the lower shaft 22a mounted in the stanchions their rear ends may also be bifurcated and pivotally connected to this shaft in the same way that their forward ends are bifurcated and pivotally connected to the shaft 20a.

It will now be seen that the forward and rear end of each link is connected to the tip supporting member or plate 17 and to the base respectively by a kind of universal connection and that the four rotatable transversely extending shafts and the four longitudinal quadrilaterally arranged links form a folding parallelogram structure by which the plate 17 is mounted on the base 10 so that it is movable parallel to itself both vertically and horizontally. During vertical components of movement of the plate 17 the transverse shafts rotate in their bearings, and during horizontal components of movement of the plate 17 the links pivot about the pivot pins which extend transversely through the shafts. It will also be noted that each of the four quadrilaterally arranged links constitutes part of one folding parallelogram which permits movement of the plate 17 in one direction and also constitutes part of a contiguous folding parallelogram which permits movement of the plate 17 in a direction at right angles to the first direction.

Any suitable means may be employed for imparting the horizontal and vertical components of movement to the tip supporting plate 17. Preferably such means acts on the folding parallelogram structure and may comprise two fluid cylinder-and-piston devices one of which is designated 32 and the other 33 (Figs. 1 and 3). As best shown in Fig. 1 the cylinder-and-piston device 32 is pivotally connected between the inner faces of the rearward extensions 25x on the two upper links 25, one of these extensions being longer than the other as shown. The cylinder of the device is pivotally connected to the rearward extension on one of the links and the piston rod of the device is pivotally connected to the rearward extension on the other link. For instance, if the part shown at 34 is the piston rod this may be pivotally connected to the rearward extension on the inner link as shown at 35, and the cylinder 36 may be pivotally connected to the rearward extension on the outer link as shown at 37. Any suitable arrangement of pipes and valves may be employed for admitting a motive fluid such as air, oil, or water to and discharging it from, either the piston end of the cylinder 36 or the rod end thereof. It will be evident that when motive fluid is admitted to the piston end of the cylinder the piston rod 34 will be extended thereby increasing the overall effective length of the cylinder-and-piston device. This will swing the rear end of the extension 25x on the outer link in an outward direction and cause the outer link to rotate about its pin connection 30 such that the tip supporting plate 17 and the forward ends of all of the links move inwardly toward the work-piece. Outward movement of the plate 17 and the forward ends of the links is effected by admitting motive fluid to the rod end of the cylinder 36 thereby decreasing the effective length of the cylinder-and-piston device.

The other cylinder-and-piston device 33 acts on one of the two rear shafts, preferably the lower one. It comprises a cylinder 38 (Figs. 1, 2 and 3) in which a piston operates connected to a piston rod 39 (Fig. 3). The piston rod 39 is pivotally connected to one end of an arm 40, the other end of which is fixed to an extension of the lower rear shaft 22a. Thus by admitting motive fluid to the rod end or the piston end of the cylinder 38 by any suitable arrangement of pipes and valves, not shown, the piston rod 39 may be extended or retracted to rotate the shaft 22a in one direction or the other. This will cause the forward ends of the four links to move vertically and thereby impart vertical components of movement to the tip supporting plate 17. The cylinder 38 may be mounted on the base 10 of the machine by means of a bracket 41 which pivotally supports the cylinder by means of trunnions 42 on the cylinder.

It will now be evident that the tip supporting plate 17 may be moved laterally, i. e. toward and away from the work-piece W, or up and down, by actuation of the cylinder-and-piston devices just described. The plate 17 always moves parallel to itself so that the angularity of the jet passages in the torch tips through which the scarfing oxygen is discharged does not change.

The plate 18 on which the other two scarfing tips 15 and 16 are mounted is supported on the base 10 for vertical and horizontal movement parallel to itself by a folding parallelogram structure similar to that already described, this folding parallelogram structure being actuated by two additional fluid cylinder-and-piston devices similar to the ones employed for actuating the folding parallelogram structure that supports the plate 17.

Figure 2:
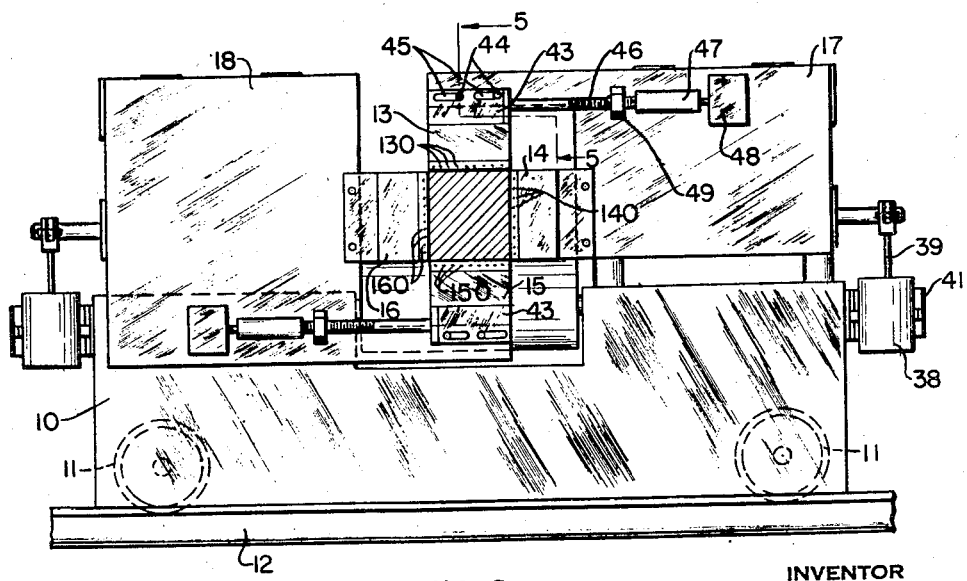
Fig. 2 is an end view of the apparatus, the work-piece being scarfed being shown in transverse section.
Figure 5:
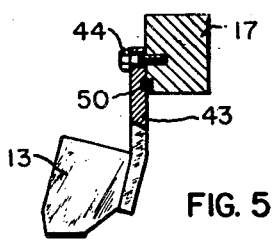
Fig. 5 is a vertical section taken along line 5—5 of Fig. 2.

The tip 13 for scarfing the upper face of the work-piece and the tip 15 for scarfing its lower face are preferably mounted on their respective plates 17 and 18 so that they can be adjusted thereon laterally of the work-piece. In the particular machine illustrated this is accomplished by mounting each of these tips on a holder 43 which in turn is connected to the corresponding plate 17 or 18 by means of bolts 44 passing through longitudinally extending slots 45 in the holder (Figs. 2 and 5). Each holder is connected to a threaded shaft 46 (Fig. 2), the threaded portion of which is received within an internally threaded collar 47 adapted to be rotated by an electric motor 48. The shaft 45 is non-rotatable but is mounted to move longitudinally of itself through a pillow block or bearing 49. Thus when the motor 48 rotates the collar 47, the shaft 46 is moved longitudinally by reason of the threaded connection between the collar and the shaft and this moves the torch tip laterally of the work-piece. The slots 45 are of sufficient length to permit the desired amount of lateral adjustment of the tip. The weight of each holder 43 and its tip is supported by a key 50 (Fig. 5) on which the holder may slide laterally.

When the torch tips are in their fully retracted position the plate 17 is in its highest outward position and the plate 18 is in its lowest outward position. After the forward end of a work-piece to be scarfed is brought within the rectangular space formed by the four discharge faces of the torch tips, the plate 17 is moved downwardly and inwardly, and the plate 18 is moved upwardly and inwardly, by actuating their two supporting folding parallelogram structures in the manner above described until the four scarfing tips mounted on the plates are in scarfing relation to the four faces of the work-piece. The four scarfing tips preferably have the same width, as shown in Fig. 2, and the maximum size work-piece which the machine is designed to scarf is one having a square cross-section whose faces have the same width as the scarfing tips. If the work-piece has the same width as the maximum size square work-piece which the machine is designed to scarf, but has less thickness, or if it has the same thickness as the maximum size square work-piece which the machine is designed to scarf, but has less width, the torch tips can be moved into proper scarfing relation with the corresponding faces of the work-piece since any tip that is wider than the face it is intended to scarf can be made to overlap the end of the contiguous tip of the other pair of tips. However, if the work-piece has less width and also less thickness than the maximum size square work-piece which the machine is designed to scarf then it is necessary to retract the tips 13 and 15 an appropriate amount by means of the motors 48 so that the tips can be moved into proper scarfing relation with the four faces of the work-piece and in proper overlapping relation without striking.

It will now be seen that the desired movement of each tip supporting member to bring the torch tips carried by it into scarfing relation with the corresponding work faces without changing the angularity of the scarfing oxygen jets is obtained by the use of an improved type of folding parallelogram structure which is simpler in construction and has fewer movable parts and bearings than the folding parallelogram mechanisms used in previous scarfing machines to obtain a commensurate result. Moreover, a folding parallelogram structure of the kind herein described permits the use of longer longitudinal links than was heretofore possible. This is an advantage because if one tip supporting member has to be moved inwardly toward the work-piece a greater amount than the other to bring the torch tips into scarfing relation with the work faces (as is the case when scarfing a work-piece that is narrower than a preceding one and when the two work-pieces are guided into the apparatus with one vertical face held against a fixed guide) there will be less longitudinal displacement of the tips that have to be moved inwardly the greater amount and therefore the scarfing oxygen discharge orifices of all of the tips will lie more nearly in the same transverse plane.

While the machine herein illustrated and described has two right angularly arranged torch tips mounted on each of the tip supporting members, the principle of the invention is applicable to a scarfing machine in which each tip supporting member carries only one torch tip.

I claim:

1. Apparatus for scarfing billets and the like during relative movement between the billet and the apparatus longitudinally of the apparatus, comprising a base, a torch tip supporting member, at least one torch tip carried by said member, and means for mounting said member on the base so that it is vertically and horizontally movable parallel to itself transversely of the apparatus, said means comprising a pair of parallel shafts rotatably mounted on said member, a second pair of shafts rotatably mounted on the base in parallel relation to each other and to the shafts of the first pair, the two pairs of shafts being spaced apart longitudinally of the apparatus, four parallel links arranged quadrilaterally and extending from one pair of shafts to the other, each of said links having an integral bifurcated portion straddling one shaft of one pair and also having another integral bifurcated portion straddling the corresponding shaft of the other pair, and a pin pivotally connecting each of said bifurcated portions of the links with the shaft which it straddles, the axis of such pin being at right angles to the axis of such shaft.

2. Apparatus for scarfing billets and the like during relative movement between the billet and the apparatus longitudinally of the apparatus, comprising a base, a torch tip supporting member, at least one torch tip carried by said member, and means for mounting said member on the base so that it is vertically and horizontally movable parallel to itself transversely of the apparatus, said means comprising a pair of upper and lower horizontally disposed parallel shafts rotatably mounted on the tip supporting member with their axes extending transversely of the apparatus, a second pair of upper and lower shafts rotatably supported on the base in parallel relation to each other and to the shafts of the first pair, the two pairs of shafts being spaced apart longitudinally of the apparatus, four parallel links arranged quadrilaterally and extending from one pair of shafts to the other, each of said links having an integral bifurcated portion straddling one shaft of one pair and also having another integral bifurcated portion straddling the corresponding shaft of the other pair, and a pin pivotally connecting each of said bifurcated portions of the links with the shaft which it straddles, the axis of such pin being at right angles to the axis of such shaft.

3. Apparatus for scarfing billets and the like during relative movement between the billet and the apparatus longitudinally of the apparatus, comprising a base, stanchions extending upwardly from the base and spaced apart transversely of the apparatus, a pair of upper and lower horizontally disposed parallel shafts each of which is rotatably mounted at its opposite ends in said stanchions, a vertically disposed torch tip supporting plate extending transversely of the apparatus and spaced from said shafts longitudinally of the apparatus, at least one torch tip supported by said plate, a second pair of upper and lower horizontally disposed shafts on said plate in parallel relation to each other and to the shafts of the first pair, four parallel links arranged quadrilaterally and extending from the pair of shafts that are mounted in said stanchions to the pair of shafts that are mounted on said plate, each of said links having an integral bifurcated portion straddling one shaft of one pair and also having another integral bifurcated portion straddling the corresponding shaft of the other pair, and a pin pivotally connecting each of such bifurcated portions of the links with the shaft which it straddles, the axis of such pin being at right angles to the axis of such shaft.

4. Apparatus for scarfing billets and the like during relative movement between the billet and the apparatus longitudinally of the apparatus, comprising a base, a torch tip supporting member, at least one torch tip carried by said member, and a folding parallelogram structure for mounting said member on the base so that it is movable parallel to itself transversely of the apparatus in a vertical direction and also in a horizontal direction, said structure comprising a pair of upper and lower horizontally disposed parallel shafts mounted on said member, a second pair of upper and lower shafts rotatably supported on the base in parallel relation to each other and to the shafts of the first pair, the two pairs of shafts being spaced apart longitudinally of the apparatus, four parallel links arranged quadrilaterally and extending from one pair of shafts to the other, each of said links being pivotally connected at one portion to one shaft of one pair and at another portion to the corresponding shaft of the other pair by a connection which permits each links to pivot relative to the shaft to which it is connected about an axis at right angles to the axis of such shaft, means operatively connected to one of the shafts on the base for rotating the same to thereby move the folding parallelogram structure so that it imparts a vertical component of movement to the tip supporting member, and means operatively connected to a portion of one of said links for moving the folding parallelogram structure so that it imparts a horizontal component of movement to the tip supporting member.

5. Apparatus for scarfing billets and the like during relative movement between the billet and the apparatus longitudinally of the apparatus, comprising a base, a torch tip supporting member, at least one torch tip carried by said member, and a folding parallelogram structure for mounting said member on the base so that it is movable parallel to itself transversely of the apparatus in a vertical direction and also in a horizontal direction, said structure comprising a pair of parallel shafts rotatably mounted on said member, a second pair of shafts rotatably mounted on the base in parallel relation to each other and to the shafts of the first pair, the two pairs of shafts being spaced apart longitudinally of the apparatus, four parallel links arranged quadrilaterally and extending from one pair of shafts to the other, each of said links having an integral portion intersecting one shaft of one pair and also having another integral portion intersecting the corresponding shaft of the other pair, a pin pivotally connecting each of said portions of the links with the shaft which it intersects, the axis of such pin being at right angles to the axis of such shaft, means operatively connected to one of the shafts on the base for rotating the same to thereby so move the folding parallelogram structure that it imparts to the tip supporting member a component of movement in one of said directions, and means operatively connected to a portion of one of said links for so moving the folding parallelogram structure that it imparts to the tip supporting member a component of movement in the other of said directions.

6. Apparatus for scarfing billets and the like during relative movement between the billet and the apparatus longitudinally of the apparatus, comprising a base, a torch tip supporting member, at least one torch tip carried by said member, and a folding parallelogram structure for mounting said member on the base so that it is movable parallel to itself transversely of the apparatus in a vertical direction and also in a horizontal direction, said structure comprising a pair of upper and lower horizontally disposed parallel shafts mounted on said member, a second pair of upper and lower shafts rotatably supported on the base in parallel relation to each other and to the shafts of the first pair, the two pairs of shafts being spaced apart longitudinally of the apparatus, four parallel links arranged quadrilaterally and extending from one pair of shafts to the other, each of said links being pivotally connected at one portion to one shaft of one pair and at another portion to the corresponding shaft of the other pair by a connection which permits each link to pivot relative to the shaft to which it is connected about an axis at right angles to the axis of such shaft, and actuating means operatively connected to the folding parallelogram structure such that the forces are transmitted through the parallelogram structure to the tip supporting member to impart to it vertical and horizontal components of movement.

JOSEPH M. TYRNER.

REFERENCES CITED

The following references are of record in the file of this patent:

UNITED STATES PATENTS

| Number | Name | Date |
|---|---|---|
| 2,208,139 | Serner | July 16, 1940 |
| 2,295,523 | Bucknam et al. | Sept. 8, 1942 |
| 2,363,036 | Anderson | Nov. 21, 1944 |
| 2,429,686 | Helmkamp | Oct. 28, 1947 |

FOREIGN PATENTS

| Number | Country | Date |
|---|---|---|
| 7,404 | Great Britain | Oct. 9, 1913 |
| 474,033 | Great Britain | Oct. 21, 1937 |